US011354359B2

(12) United States Patent
Hasegawa et al.

(10) Patent No.: US 11,354,359 B2
(45) Date of Patent: Jun. 7, 2022

(54) ORDERING ARCHIVED SEARCH RESULTS

(71) Applicant: International Business Machines Corporation, Armonk, NY (US)

(72) Inventors: Tohru Hasegawa, Tokyo (JP); Hiroaki Uetsuki, Machida (JP); Shunsuke Ishikawa, Shinjuku (JP); Yasuyuki Tominaga, Saitama (JP); Kenta Watanabe, Soka (JP); Asako Ono, Setagaya (JP)

(73) Assignee: International Business Machines Corporation, Armonk, NY (US)

( * ) Notice: Subject to any disclaimer, the term of this patent is extended or adjusted under 35 U.S.C. 154(b) by 425 days.

(21) Appl. No.: 16/701,199

(22) Filed: Dec. 3, 2019

(65) Prior Publication Data

US 2021/0165834 A1  Jun. 3, 2021

(51) Int. Cl.
*G06F 16/90* (2019.01)
*G06F 16/903* (2019.01)
*G06F 16/9038* (2019.01)
*G06F 3/06* (2006.01)

(52) U.S. Cl.
CPC ...... *G06F 16/90348* (2019.01); *G06F 3/0605* (2013.01); *G06F 3/0653* (2013.01); *G06F 3/0686* (2013.01); *G06F 16/9038* (2019.01)

(58) Field of Classification Search
CPC . G06F 16/1873; G06F 16/176; G06F 3/04847
See application file for complete search history.

(56) References Cited

U.S. PATENT DOCUMENTS

| 8,768,932 | B1* | 7/2014 | Kacholia ............. G06F 16/9535 |
| | | | 707/706 |
| 9,343,111 | B2 | 5/2016 | Katagiri et al. |
| 9,619,147 | B2 | 4/2017 | Katagiri et al. |
| 2008/0033922 | A1* | 2/2008 | Cisler ................... G06F 16/955 |
| | | | 707/E17.081 |
| 2014/0281211 | A1 | 9/2014 | Evans et al. |
| 2019/0187913 | A1 | 6/2019 | Hasegawa et al. |

FOREIGN PATENT DOCUMENTS

JP  2016099728 A  5/2016

OTHER PUBLICATIONS

Unknown, "Query Re-Ranking", Apache Solr Reference Guide, Site Version: 6.6, Site last generated: Jun. 9, 2017, printed Aug. 15, 2019, 5 pages, <https://lucene.apache.org/solr/guide/6_6/query-re-ranking.html>.
Mell et al., "The NIST Definition of Cloud Computing", Recommendations of the National Institute of Standards and Technology, Sep. 2011, 7 pages.

* cited by examiner

*Primary Examiner* — Loc Tran
(74) *Attorney, Agent, or Firm* — Donald J. O'Brien (57) ABSTRACT

Embodiments are disclosed for a method for ordering search results. The method includes identifying a plurality of archived search results generated by a keyword search. The method also includes searching a plurality of indices of a plurality of corresponding tape libraries comprising a plurality of tapes storing the archived search results. The method additionally includes determining a plurality of estimated access times corresponding to the archived search results based on the indices. Further, the method includes sorting the archived search results based on the estimated access times to create a time-based order.

8 Claims, 8 Drawing Sheets

ORDERING ARCHIVED SEARCH RESULTS

BACKGROUND

The present disclosure relates to search results, and more specifically, to ordering archived search results.

The Internet serves as a source of large amounts of data, where data can be archived, searched, and used, as requested. However, some data may not be used frequently, so it can be archived. Accordingly, such archived data can be stored in tape libraries that have lower costs than other forms of storage.

SUMMARY

Embodiments are disclosed for a method for ordering search results. The method includes identifying a plurality of archived search results generated by a keyword search. The method also includes searching a plurality of indices of a plurality of corresponding tape libraries comprising a plurality of tapes storing the archived search results. The method additionally includes determining a plurality of estimated access times corresponding to the archived search results based on the indices. Further, the method includes sorting the archived search results based on the estimated access times to create a time-based order.

Further aspects of the present disclosure are directed toward systems and computer program products with functionality similar to the functionality discussed above regarding the computer-implemented methods. The present summary is not intended to illustrate each aspect of, every implementation of, and/or every embodiment of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

While the present disclosure is amenable to various modifications and alternative forms, specifics thereof have been shown by way of example in the drawings and will be described in detail. It should be understood, however, that the intention is not to limit the present disclosure to the particular embodiments described. On the contrary, the intention is to cover all modifications, equivalents, and alternatives falling within the spirit and scope of the present disclosure.

DETAILED DESCRIPTION

As stated previously, search queries can produce results that may be archived. For example, documents, images, and video can be archived on tape in a tape library. However, tapes provide slower random access speeds than other forms of storage, such as, solid state disk, high density disk, and the like. Thus, in order to perform a random access search for archived data efficiently, tape libraries can include an index that identifies the tape where specific files or other indexed data is stored. In some cases, the search engine can store a keyword index for the tape library on a hard disk drive (HDD), solid state device (SSD), or other storage system with faster random access time than tapes. In this way, the index can make it possible to locate data stored on tape more quickly than by searching the actual storage tapes. Additionally, the index can include the tape location, metadata, and brief descriptions of the stored data (known as "snippets").

For example, a user can request a search across a tape library by entering keywords into the web browser interface of a search engine. The search engine can execute the search against the index. The search engine can use the keyword(s) against the index and retrieve data metadata and the like for multiple elements of indexed data stored on the tapes. Accordingly, the search engine can display a search result. The search result can include the data metadata, snippet, and the like in a list on the web browser interface.

The list can be ordered based on predetermined preferences. In some cases, the preferences can indicate that the search results are ordered based on relevance to the search keywords. For example, the search query can include two keywords, "alpha" and "beta". The search engine may find 20 relevant index entries for the keywords. Some of the index entries are relevant to alpha; some are relevant to beta; some are relevant to both. Thus, for a predetermined relevance preference, the search results relevant to both keywords are listed first in the search results. Afterward, the index entries relevant to the first keyword may be considered more relevant than those relevant to the second keyword; so the remaining search results may be listed accordingly.

The search results can be configured with hyperlinks, for example, that can retrieve the stored data for a clicked search result and update the web browser interface for the retrieved data from the tape library. The hyperlinks can include uniform resource locators (URLs) that identify specific files on a network. However, the user may review the metadata and the like of each search result in the order they are displayed. Thus, if the user clicks multiple search result index entries, in many cases, the sequence that the user clicks on each search result is the same order as the search results are displayed.

For example, a user may request a search query for video data. The search engine can display the search results in a list ordered based on predetermined preferences. Further, the user may examine the metadata, etc. for each search result in the order the search results are displayed. The user may click on each search result, wherein the browser may load a new page of content. The user may further review the actual data on the new page, and potentially, copy data for further use. While retrieving data from tape may take longer than retrieving data from disk, if the data for multiple search results is stored on multiple tapes in the tape library, the order in which the search result data is retrieved can affect how long data retrieval takes. Thus, if the user clicks on each search result in the order displayed, the data retrieval may take longer than if the search results were clicked in a different order.

The reason that data retrieval from tape takes longer than data retrieval from disk is because a computer can read HDD or SDD, for example, automatically (without human intervention). In contrast, reading from tape can mean a human being or robot physically retrieves the tape from the tape library, unmounts whatever tape is on the tape drive, and mounts the retrieved tape for the computer system to read.

Suppose ordered search results R1, R2, and R3 are stored on tapes T1, T2, and T1, respectively, and the computer system is configured with one tape drive. Thus, if the user clicks on the search results in the order they are displayed, the computer system reads the data in the same order. Thus, reading out the search results in the order of R1, R2, R3 can involve the following steps: a human being or robot retrieves tape T1, unmounts the current tape on tape drive, and mounts tape T1. Further, the tape drive may spin the tape until the head of the tape drive that electrically reads the tapes is positioned at the location of the data for search result R1 and read out R1. Next, the human being or robot can unmount tape T1, retrieve tape T2 from the tape library, and mount tape T2. The tape drive may then spin the tape until the head is positioned at the location of the data for search result R2 and reads out R2. Next, the human being or robot can unmount tape T2, and re-mount tape T1. The tape drive may then move position the tape over the head at the location of the data for search result R3 and read out R3.

Thus, even though two of the search results are stored on the same tape (R1 and R3 on tape T1), retrieving the search results in this order results in mounting the same tape twice. Depending on the type of tape drive and tape library used, minutes of time can be saved if—instead of the above scenario—the tape T1 can be mounted one time during which the tape drive reads both results. Additional time can also be saved if the order of reading out the data for search results R1 and R3 can be based on the positions on the tape where the data is written. For example, if the data for R1 is positioned near the end of the tape, and the data for R3 is near the beginning of the tape, it may be faster to read the data for R3 before the data for R1. In this way, the tape drive can spin the tape to the location of the R3 data, read the R3 data, then proceed to spin the tape to the location of the R1 data. Otherwise, the tape drive may spin the tape towards the end, read R1 data, then rewind the tape back to the position of R3 before reading the R3 data. Thus, the R3 data may be spun over twice before being read, instead of reading the R3 data the first time it physically approaches the head of the tape drive. As such, reading the data in the order R3, R1 can be faster than reading the data in the order R1, R3. In some tape drive systems, it is possible to determine the position of data stored on a tape and/or estimate the time taken to read out the data.

Accordingly, in some embodiments of the present disclosure, a search engine can display search results in an order whereby retrieving the data for each result in the order displayed results in faster retrieval times than current systems. For example, the search engine can display the search results in an order based on data storage positions of the related data (e.g., R3, R1, R2 or R2, R3, R1 in the previous example).

Figure 1:
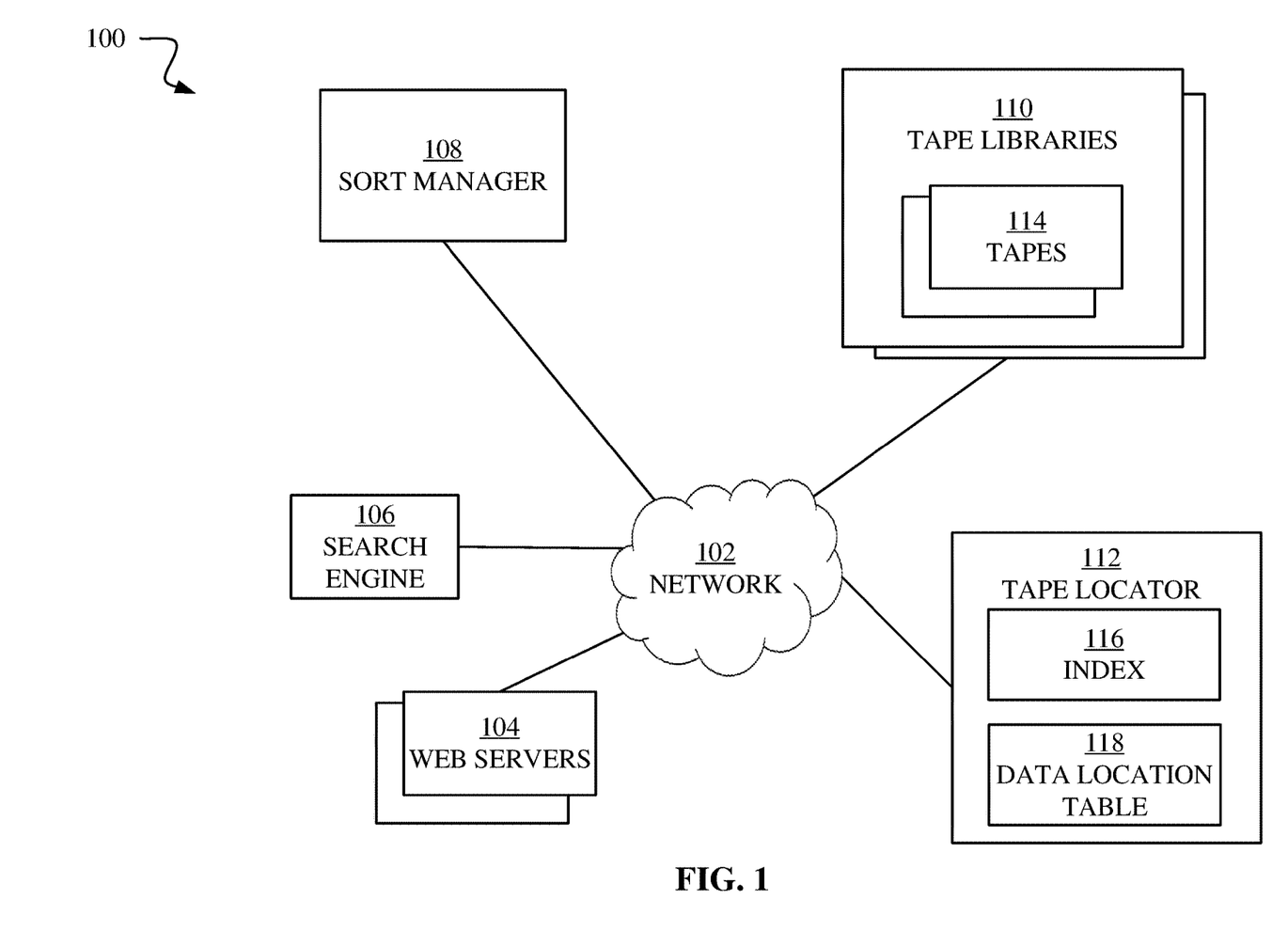
FIG. 1 is a block diagram of an example system for ordering archived search results, in accordance with some embodiments of the present disclosure.

FIG. 1 is a block diagram of an example system 100 for ordering archived search results, in accordance with some embodiments of the present disclosure. The system 100 includes a network 102, web servers 104, search engine 106, sort manager 108, and a tape library 110. The network 102 can be one or more computer communication networks, including local area networks (LANs) and wide area networks (WANs), such as the Internet. Thus, the search engine 106, sort manager 108, web servers 104, tape library 110, and tape locator 112 can communicate via the network 102. The web servers 104 can be one or more computing platforms of the World Wide Web on the Internet. Thus, the web servers 104 can represent various platforms connected with the Internet that provide news, entertainment, education, and the like, from around the globe. The web servers can include documents, video, and various other types of content.

The search engine 106 can be a computer platform that catalogs information about various content and other data on the web servers 104. Accordingly, the search engine 106 can take a search request for one or more keyword, search the search engine's catalog (not shown) for the keyword(s), and provide links to the various web servers 104 with data relevant to the search request. In some cases, the web servers 104 can archive data in a tape library 110. Web servers 104 and other computing platforms may archive data to a tape library 110 when the data is not used for a predetermined period of time. In this way, data with more frequent access can be kept available on the faster storage devices.

As such, for archived data, the search engine 106 can provide links to the tape libraries 110 where the relevant data can be stored. In some embodiments of the present disclosure, the search engine 106 can order the search results based on predetermined preferences, such as relevance to the keyword(s). However, as stated previously, ordering archived search results in this way can result in longer data retrieval access times. Accordingly, the sort manager 108 can change the order of the search results, thus changing the order in which the search engine 106 displays the search results. In some embodiments, the search engine 106 can display the search results in an order based on data storage positions of the related data. Alternatively, a predetermined number threshold of the first n search results can be ordered based on predetermined preferences, such as keyword relevance. Thus, after displaying the first n search results, the sort manager 108 can reorder the search results so as to reduce access time when the search results are retrieved in order displayed. The threshold n can be statically determined or dynamically determined such that the results exceeding the threshold n is based on a ranking score, such as relevance. Thus, any search result with a ranking less than a predetermined percentage, 90% relevance, for example, can be ordered such that retrieving the data in the displayed order reduces access time in comparison to other potential ordered retrievals.

The tape libraries 110 can include tapes 114. The tapes 114 can be magnetic tapes stored on reels that are wound to specific storage locations, from where data can be read.

On a tape 114, data can be stored in a longitudinal direction. Thus, as data is written sequentially to the tape, the physical end of the tape 114 may be approached. Accordingly, the tape 114 or head can be moved in a vertical direction, and the tape 114 can be rewound to enable writing further data in a reverse longitudinal direction. As such, the position of a specific file or other data can be represented by a position in the longitudinal direction of the tape 114 (LPOS) and by a position in the width direction of the tape 114 (WRAP). TABLE 1 represents an example array that associates specific data files with their physical locations on tape.

TABLE 1

| DATA ID | TAPE ID | START LPOS | START WRAP | END LPOS | END WRAP |
|---|---|---|---|---|---|
| DOCUMENT A | TAPE 1 | 10,000 | 5 | 13000 | 5 |
| DOCUMENT B | TAPE 5 | 30,000 | 3 | 32000 | 3 |
| DOCUMENT C | TAPE 3 | 15,000 | 2 | 1000 | 3 |

As shown, TABLE 1 includes a data identifier (ID), a tape ID, start LPOS and WRAP, and an end LPOS and WRAP. The data ID may be unique file name, for example, or other identifier for the data. The tape ID can identify a specific tape 114 on which the data is stored. The start LPOS can represent the longitudinal position on the tape where the data of the file begins. The start WRAP can indicate the position in the width direction of the tape 114 where the file begins. Similarly, end LPOS can represent the longitudinal position of the last elements of the file; and, the end WRAP can represent the position in the width direction of the tape 114 where the file ends. Thus, document A is stored from LPOS 10,000 to LPOS 13,000 in WRAP 5 of tape 1. Additionally, document B is stored from LPOS 30,000 to LPOS 32,000 in WRAP 3 of tape 5. As such, documents A and B are stored within a single WRAP. In contrast, document C starts at LPOS 15000 in WRAP 2 and ends at LPOS 1000 in WRAP 3.

The search engine 106 can generate the tape locator 112, which can include one or more storage devices, such as SSD, HDD, flash storage and the like, that provide faster random data access than tapes 114. The tape locator 112 can be a server, for example, that is used to determine where an archived tape is stored. The tape locator 112 includes an index 116 and a data location table 118. The index 116 can be a keyword index that identifies metadata, snippets, and the like about data stored on the tapes 114. Further, the index 116 can identify the tape 114 and specific tape location where data relevant to specific keywords is stored. The data location table 118 can identify the tape drive on which the tape holding a specific result is loaded. The data location table 118 is different from the index 116; however, information stored in the data location table 118 can be included in the index 116.

A tape library, such as tape library 110 can include multiple tape drives (not shown) to read its many tapes 114. However, there may be many more tapes 114 than tape drives. As such, even after being retrieved from the tape library 110, the tape 114 may wait in a queue to be read from one of the tape drives. Thus, to estimate the access time for retrieving data from tape, it is useful to know which tape library and tape drives are being used. Additionally, it is useful to have a table, such as the data location table 118, that documents the relationship between archived search results, the tapes that the search results are stored on, and the tape drives the tapes 114 are assigned to for reading.

In some embodiments of the present disclosure, the search engine 106 can perform a keyword search that identifies a set of search results with links to respective web servers 104 and tape libraries 110 across the network 102. Further, the sort manager 108 can use the data location table 118 to determine how much time the access of each search result takes and reorder the search results based on the access time. Thus, the search results ordered by access time can be displayed in an order where the earlier a search result appears, the lesser amount of time it takes to access the associated search result. Thus, search results appearing later in the order can take longer to access than search results appearing earlier in the order.

Figure 2:
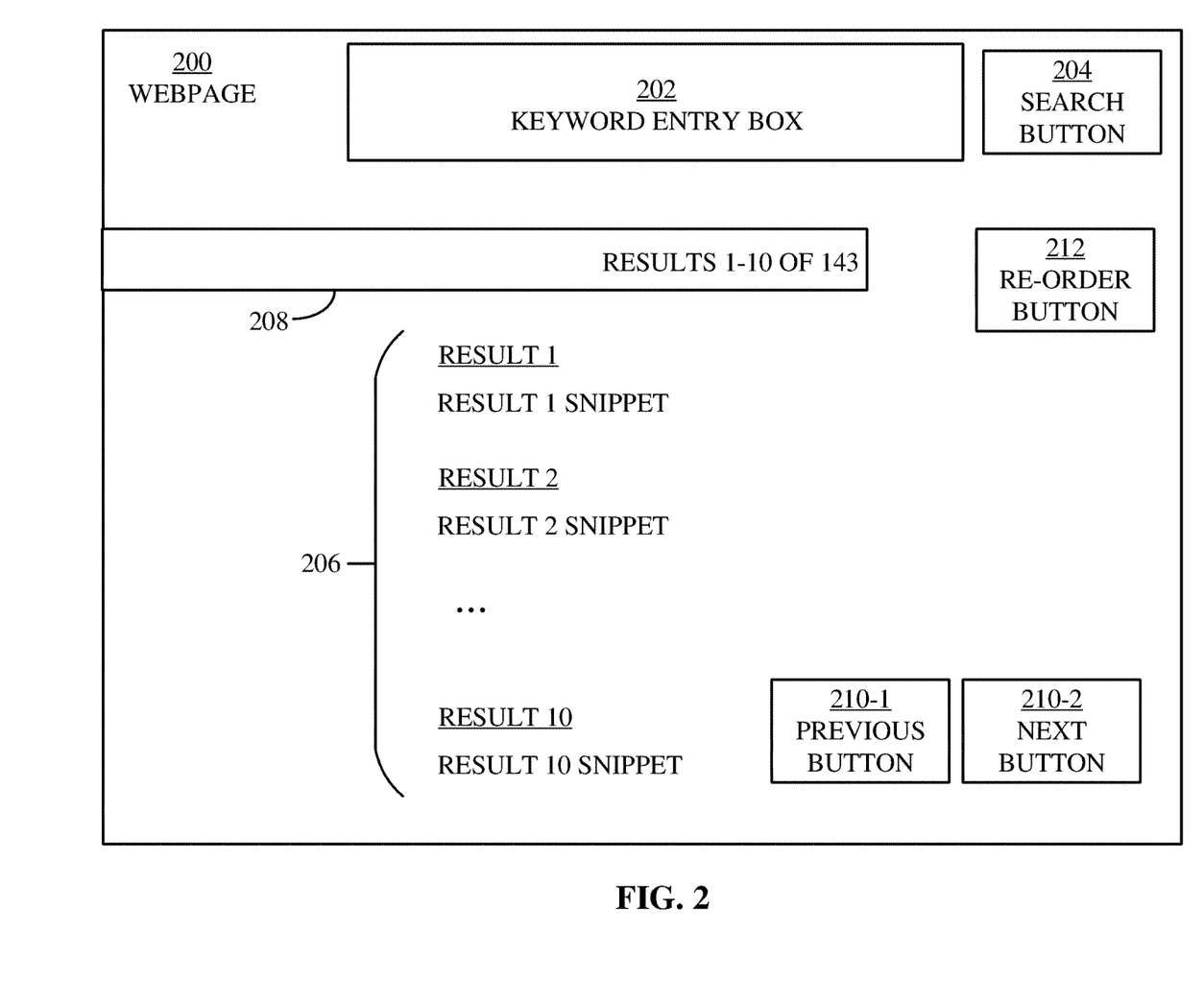
FIG. 2 is a block diagram of a webpage for a search engine, in accordance with some embodiments of the present disclosure.

FIG. 2 is a block diagram of a webpage 200 for a search engine, in accordance with some embodiments of the present invention. The webpage 200 can be provided and operated by a search engine, such as the search engine 106 (shown in FIG. 1). Further, the webpage 200 includes a keyword entry box 202, search button 204, result rows box 208, re-order button 212, displayed results 206, and navigation buttons: previous button 210-1 and next button 210-2. The keyword entry box 202 can be used to enter keywords for a search. The search button 204 can send a request to search for the keywords across a network, such as the network 102 (shown in FIG. 1). In response, the search engine can provide the displayed results 206 for display on the webpage 200. In this example, the displayed results 206 include, for each search result, an underlined hyperlink, e.g., "RESULT 1," and a snippet, e.g., "RESULT 1 SNIPPET." The hyperlink can be configured with a URL to retrieve a file from the URL in response to a click on the hyperlink. The snippet can include a brief description of the content of the file, or a brief portion of the content from the hyperlinked file. In this example, the displayed results 206 include RESULT 1 through RESULT 10. The search engine 106 can limit the number of results displayed on a web page to a predetermined threshold. Thus, when a search request returns a large number of results, displaying results 10 at a time, for example, may help for the clarity of the reader. As such, the result rows box 208 can describe the position in the total number of search results that the displayed results 206 represent. For example, the result rows box 208 indicates that the displayed results 206 represent the first 10 results in a total of 143 results returned by the search engine 106 for the search request. Thus, in this example, previous button 210-1 and next button 210-2 may navigate through the list of 143 search results. Accordingly, in response to a press of the next button 210-2 in this example, the search engine 106 may return results 11 through 20 for display. Additionally, from the display of results 11 through 20, pressing the previous button 210-1 can result in the search engine 106 returning the search results 1 through 10 for display.

According to some embodiments of the present disclosure, the webpage 200 can include the re-order button 212. As stated previously, the search engine 106 can automatically sort the search results based on predetermined preferences, such as a relevance ranking. However, in some embodiments of the present disclosure, a sort manager, such as the sort manager 108 (shown in FIG. 1) can respond to a press of the re-order button 212 by re-ordering the search results based on access time. Thus, the first search result can include the search result with the comparatively lowest access time of the search results, increasing until the last search result, which can include the search result with the comparatively highest access time of the search results. In some embodiments of the present disclosure, a first set of search results can be ordered according to the predetermined preferences (e.g., relevance). The subsequent search results, however, can be ordered based on the access time.

Additionally, the display of the re-order button 212 can change based on the ordering of the search results. For example, if the search results are ordered based on ranking, the re-order button 212 can display the instruction, "ORDER BY ACCESS TIME," indicating that pressing the re-order button 212 can result in re-ordering the search results in an ascending order based on the amount of time involved in accessing the search results. Similarly, when the search results are ordered based on access time, the re-order button 212 can display the instruction, "ORDER BY RANKING," indicating that pressing the re-order button 212 can result in re-ordering the search results in ascending order based on the search engine ranking.

In some embodiments of the present disclosure, the displayed results 206 can also include an estimate of the access time for each displayed result 206. However, the estimated access time can change after access. As such, after accessing one of the displayed results 206, the sort manager 108 can re-calculate the estimated access times for the displayed results 206.

Figure 3:
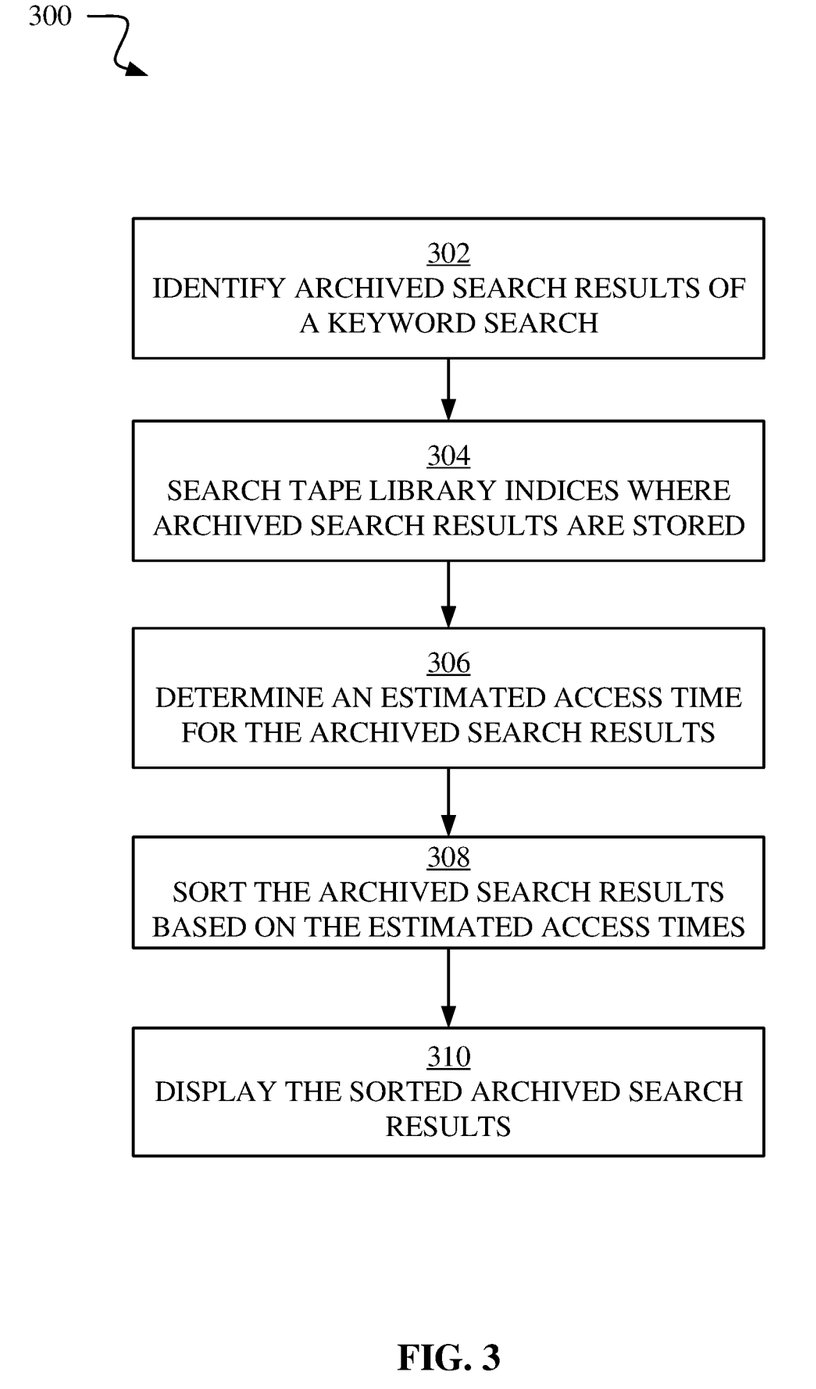
FIG. 3 is a process flow diagram of a method for ordering archived search results, in accordance with some embodiments of the present disclosure.

FIG. 3 is a process flow diagram of a method 300 for ordering archived search results, in accordance with some embodiments of the present disclosure. The method 300 can be performed by a sort manager, such as the sort manager 108 described with respect to FIG. 1. Referring back to FIG. 3, the sort manager 108 can identify archived search results from a keyword search. For example, the search engine 106 can perform a keyword search that generates 100 search results. Of those search results, 90 may include archived data, and those results are identified at operation 302. In other words, retrieving the archived data means retrieving from tape.

Accordingly, at operation 304, the sort manager 108 can search the tape library indices where the archived search results are stored. The tape library indices may include an index such as, the index 116 described with respect to FIG. 1.

Referring back to FIG. 3, at operation 306, the sort manager 108 can determine an estimated access time for the archived search results. The estimated access time can represent how much time it may take to access each of the archived search results and may be based on the physical location of the archived search result in a tape library, such as the tape library 110.

At operation 308, the sort manager 108 can sort the archived search results based on the estimated access time. In some embodiments of the present disclosure, a predetermined threshold may be used whereby the first threshold n search results are sorted based on a ranking. Thereafter, the remaining search results including archived search results are sorted based on the estimated access time.

At operation 310, the sort manager 108 can display the sorted archived search results. In the threshold example, a first web page generated in response to a keyword search can display the first n search results, which can be sorted based on a ranking, for example. In addition, subsequent search results beyond the n threshold are displayed, sorted based on the estimated access time. In some embodiments, the threshold can be based on the ranking. For example, a threshold of 90% can mean that search results with a 90% ranking or higher are sorted by ranking. Thereafter, search results with a ranking below 90% can be sorted based on the estimated access time.

Figure 4:
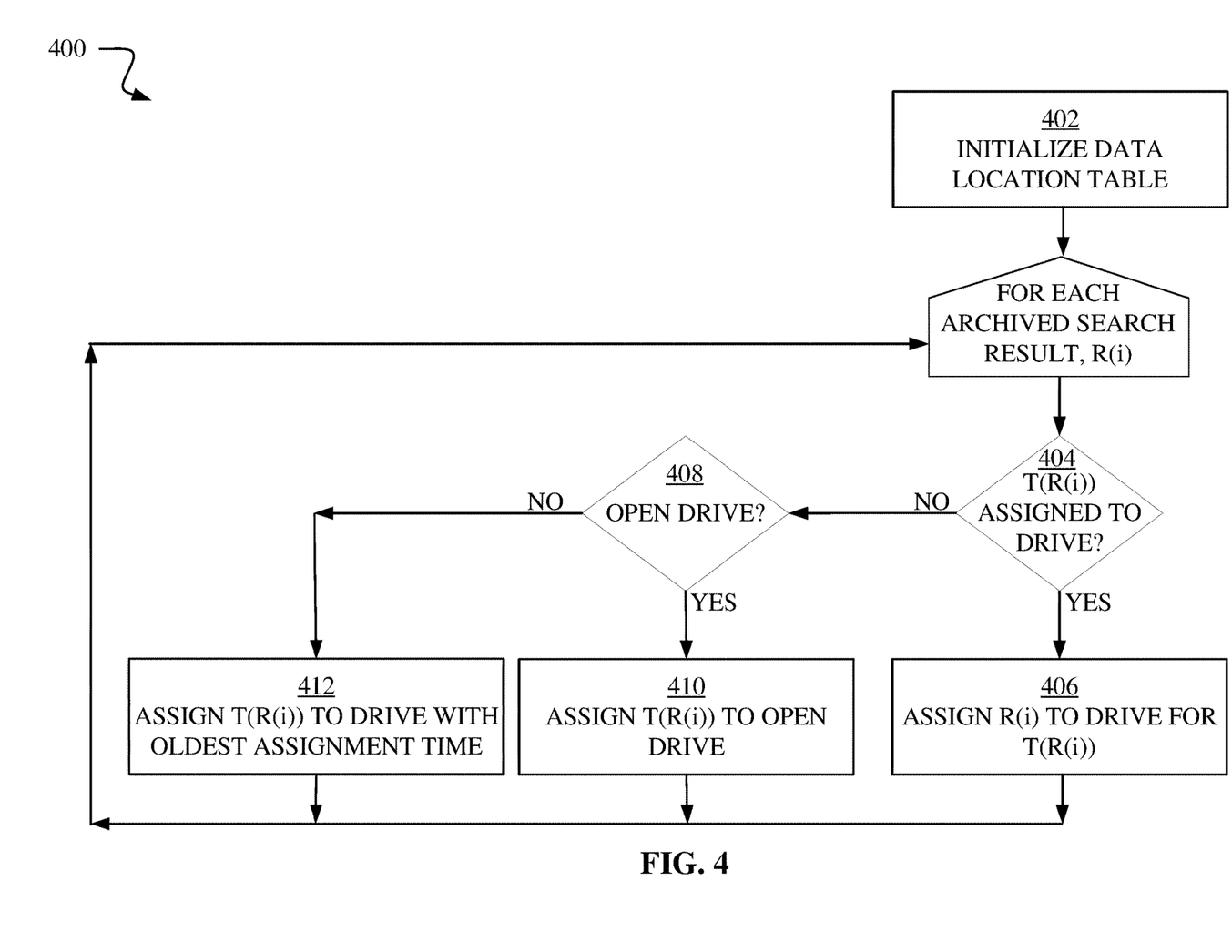
FIG. 4 is a process flow diagram of a method for generating a data location table for archived search results, in accordance with some embodiments of the present disclosure.

FIG. 4 is a process flow diagram of a method 400 for generating a data location table for archived search results, in accordance with some embodiments of the present disclosure. The method 400 can be performed by the sort manager 108 for a data location table, such as the data location table 118. TABLE 2 is an example data location table 118.

TABLE 2

| TAPE DRIVE #/ ASSIGNED TAPE | TAPE DRIVE 1 | TAPE DRIVE 2 | ... | TAPE DRIVE N |
|---|---|---|---|---|
| TAPE NUMBER | T2 | T3 | | T4 |
| ASSIGNED TIME | 2019/2/8 10:21:30.111111 | 2019/2/8 10:21:30.333333 | | 2019/2/8 10:21:30.55555 |
| ASSIGNED RESULT [R(i)] | R(3) | R(1) | | R(8) |

TABLE 2 includes columns representing each tape drive, and rows that represent the tape and search result read by the associated tape drive. More specifically, the tape number represents an identifier of the tape being read by the tape drive represented in this column. Thus, tape T2 is assigned to tape drive 1 for reading, tape T3 to tape drive 2, and tape T4 to tape drive n, in this example. The assigned time can represent a specific date and time that the tape is assigned to the tape drive. TABLE 2 includes an example that extends the time to the sixth decimal point; however, this is merely one example other embodiments are possible with various configurations from the year down to fractions of seconds. The assigned result R(i) represents the specifically numbered search result being read from the tape on this tape drive. Thus, R(3) is being read off of tape T2 on tape drive 1; R(1) is being read off of tape T3 on tape drive 2; and, R(8) is being read off of tape T4 on tape drive n.

Herein, the tape number may also be referred to as T(R(i)), which may represent the tape holding result number i. Thus, in TABLE 2, for example, T(R(1)) refers to tape T3, T(R(3)) to tape T2, and T(R(8)) to tape T4. When there are no tape drives available to read tapes, the sort manager 108 may still assign tapes to tape drives.

At operation 402, the sort manager 108 can initialize the data location table 118 for the tape library 110. Initializing the data location table 118 can involve identifying the tapes currently loaded in the tape library's tape drives. Thus, the sort manager 108 can populate the tape number row. However, as the assigned time may be unknown, and no search results are yet assigned, the assigned time and assigned result may be left blank. Once the data location table 118 is initialized, the sort manager 108 can perform operations 404 through 412 for each archived search results, R(i).

At operation 404, the sort manager 108 can determine whether tape T(R(i)) is currently assigned to a tape drive. If so, control may flow to operation 406. If not, control may flow to operation 408.

At operation 406, the sort manager 108 can assign the search result R(i) to the tape drive holding tape T(R(i)). Because T(R(i)) is already loaded, this means the sort manager has already populated the tape number for this tape drive. This also means it is possible to assign the result T(i) to the tape drive. Additionally, the sort manager 108 can set the assignment time to the current time. For the purpose of estimating access time, assuming a tape already loaded on a tape drive is just assigned, is sufficient. However, other embodiments can use other values for assignment time in such cases. Additionally, control can proceed to the next search result R(i) and flow to operation 404.

As stated previously, control flows to operation 408 if T(R(i)) is not assigned to a tape drive. Accordingly, at operation 408, the sort manager 108 can determine whether there is an open tape drive. An open tape drive can be a tape drive without a tape currently loaded. If there is an open tape drive, control can flow to operation 410. If not, control can flow to operation 412.

At operation 410, the sort manager 108 can assign tape T(R(i)) to the open tape drive. Further, the sort manager 108 can set the assignment time for the open tape drive to the current time. Additionally, control can proceed to the next search result R(i) and flow to operation 404.

At operation 412, with no open tape drives, the sort manager 108 assigns tape T(R(i)) to the tape drive in the data location table 118 with the oldest assignment time. At this time, it is unknown whether the tape T(R(i)) eventually will be read off this tape drive. However, using this assumption can be useful for estimating the access time for reading result R(i). This may be useful because the tape drive having the longest assigned tape may be more likely to be the next available. Additionally, control can proceed to the next search result R(i) and flow to operation 404.

Figure 5:
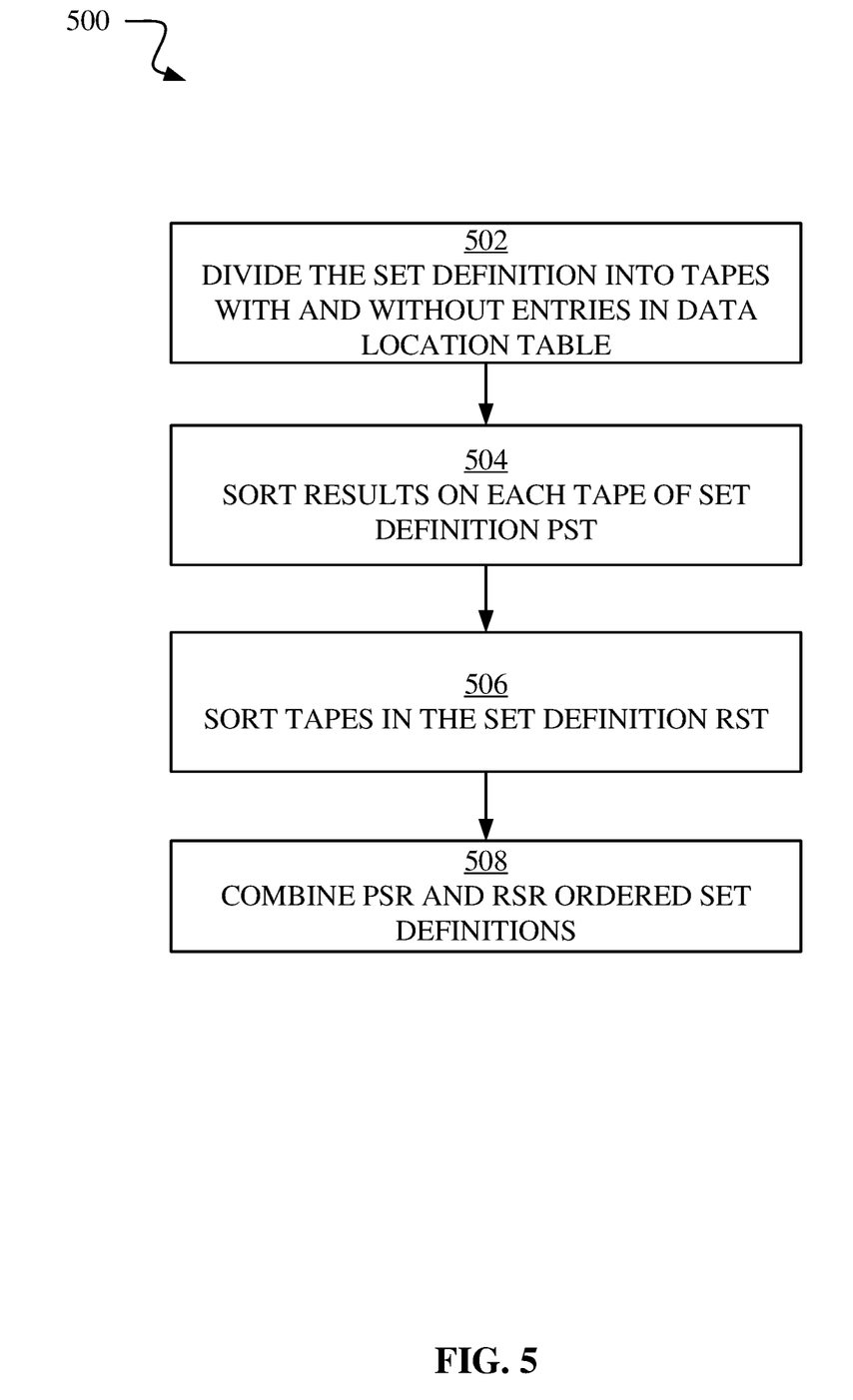
FIG. 5 is a process flow diagram of a method for ordering archived search results, in accordance with some embodiments of the present disclosure.

FIG. 5 is a process flow diagram of a method 500 for ordering archived search results, in accordance with some embodiments of the present disclosure. The sort manager 108 can perform the method 500 using the data location table 118 generated as described with respect to FIG. 4.

Referring back to FIG. 5, for the purpose of the discussion of the method 500, a set of tapes that store R(i) is referred to herein as $ST=\{T_{t1}, \ldots, T_{ij}\}$, and a set of search results included in $T_{ta}$ is referred to herein as $RS(T_{ta})$.

At operation 502, the sort manager 108 can divide the set definition, ST, into tapes with and without entries in data location table. The data location table 118 can be loaded by the first n search results because the first n search results can be ordered by the search engine's ranking. Thereafter, results $R_{n+1}, \ldots R_k$ can be re-ordered by access time. As such, $R_{n+1}, \ldots R_k$ can be divided by PST and RST. However, if n=0, all $R_i$ can be in RST. More specifically, the tape numbers in the data location table 118 and the tape numbers included in the ST can be compared in reverse chronological order of assigned time. Accordingly, a subset of the ST, in which tapes of the ST that are included in the data location table 118 are arranged in reverse chronological order of assigned time, is placed into a new set, referred to herein as PST, where PST $\{T_{p1}, \ldots, T_{pb}\}$. The remaining tapes in the set ST are placed into a new set, referred to herein as RST, where $RST=\{T_{r1}, \ldots, T_{rc}\}$.

At operation 504, the sort manager 108 can sort results on each tape of set PST. In this way, when one tape includes multiple search results, the sort manager 108 can sort the search results such that reading the search results in the sorted order provides a quicker access time than other potential sort orders. Assuming that the head for the tape drive is positioned at the end LPOS and end WRAP of an assigned result R(i) on tape $T_{pi}$, the time it takes to read out each result can be estimated based on the start LPOS and start WRAP of the results included in $RS(T_{pi})$. Accordingly, the result that takes the comparatively lower readout time may be positioned first in the sort order, referred to herein as $R_{y1}$. Additionally, assuming that the head is positioned at the END LPOS and END WRAP of $R_{y1}$, the remaining unsorted result that uses the comparatively lower readout time is set as $R_{y1+1}$, and so on for all results $RS(T_{pi})$ on each tape. Thus, the sorted order can produce an ordered set, referred to herein as PSR, wherein $PSR=\{R_{y1}, \ldots, R_{yd}\}$.

At operation 506, the sort manager 108 can sort tapes in the set RST. As stated previously, the set $RST=\{T_{r1}, \ldots, T_{rc}\}$. Further, the result stored in $T_{ri}$ that has the smallest start LPOS is referred to herein as $RR(T_{ri})$. As such, the sort manager 108 can sort results $RR(T_{r1}), \ldots, RR(T_{rc})$ in increasing order of start LPOS. Additionally, the result stored in $T_{ri}$, which has the smallest START LPOS, is referred to herein as $R_{y1}$. Thus, assuming that the head is positioned at the end LPOS and end WRAP of $R_{y1}$, the remaining results that takes the comparatively lower readout time is represented as $R_{y1+1}$, and so on, for all the results included in $RS(T_{ri})$. Further, the sort manager 108 can sort each $T_{ri}$ included in the RST based on the access times of $R_{y1}$ for each tape. The sorted order can produce an ordered set, referred to herein as RSR, wherein $RSR=\{R_{z1}, \ldots, R_{ze}\}$.

At operation 508, the sort manager 108 can combine the PSR and RSR set definitions. More specifically, the sort manager 108 can combine and sort the ordered search results included in $PSR=\{R_{y1}, \ldots, R_{yd}\}$ and $RSR=\{R_{z1}, \ldots, R_{ze}\}$ to produce a new ordered set, referred to herein as ASR, wherein $ASR=\{R_{y1}, \ldots, R_{yd}, R_{z1}, \ldots, R_{ze}\}$.

When the search results are displayed in the order of $R_{y1}, \ldots R_{yd}, R_{z1}, \ldots R_{ze}$, retrieving each of the search results in the sorted order can result in less readout time than if retrieving the search results in another sorted order.

Figure 6:
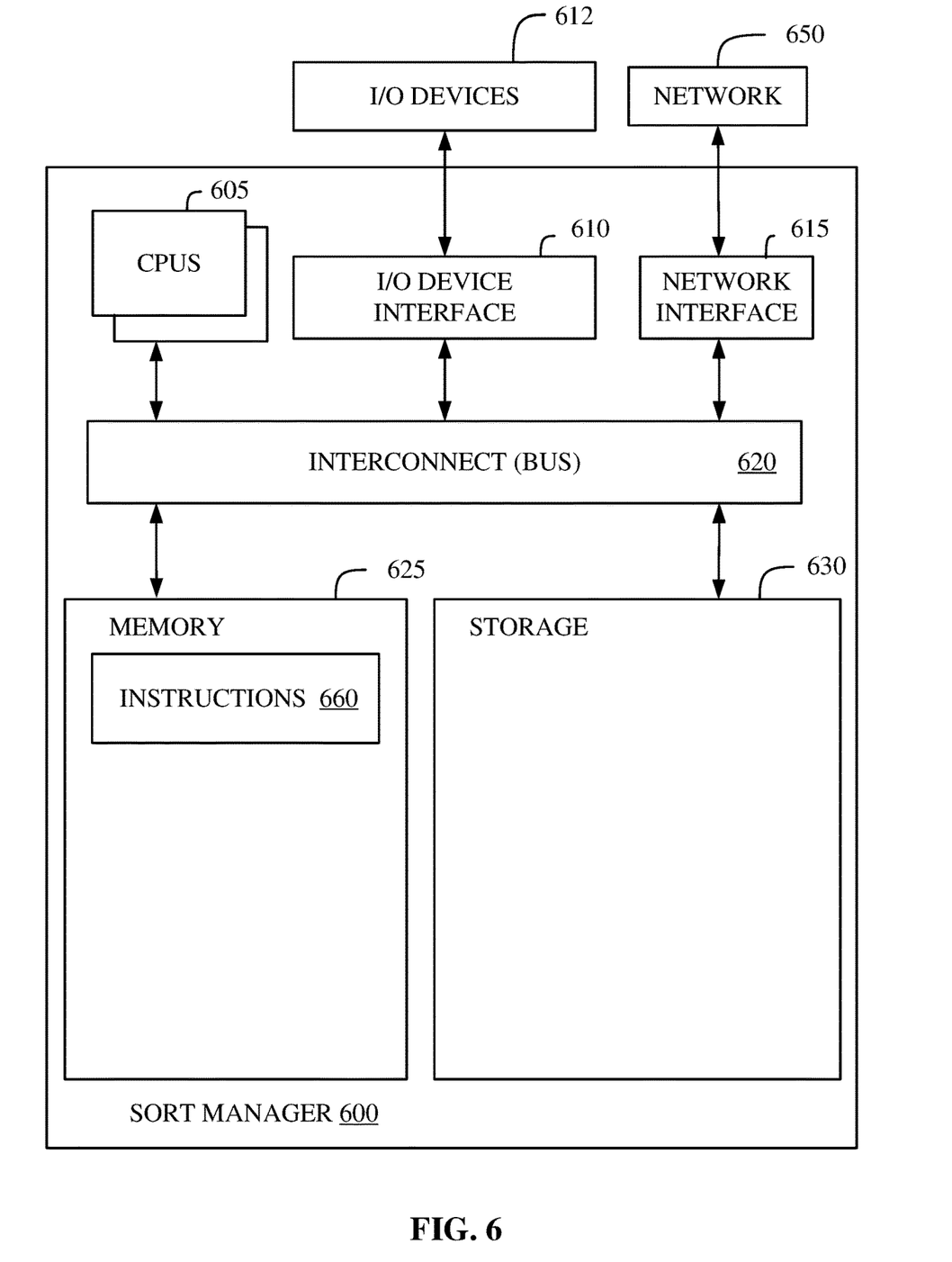
FIG. 6 is a block diagram of an example sort manager, in accordance with some embodiments of the present disclosure.

FIG. 6 is a block diagram of an example sort manager 600, in accordance with some embodiments of the present disclosure. In various embodiments, the sort manager 600 is similar to the sort manager 108 and can perform the methods described in FIGS. 3-5, and/or the functionality discussed in FIGS. 1 and 2. In some embodiments, the sort manager 600 provides instructions for the aforementioned methods and/or functionalities to a client machine such that the client machine executes the method, or a portion of the method, based on the instructions provided by the sort manager 600. In some embodiments, the sort manager 600 comprises software executing on hardware incorporated into a plurality of devices.

The sort manager 600 includes a memory 625, storage 630, an interconnect (e.g., BUS) 620, one or more CPUs 605 (also referred to as processors 605 herein), an I/O device interface 610, I/O devices 612, and a network interface 615.

Each CPU 605 retrieves and executes programming instructions stored in the memory 625 or the storage 630. The interconnect 620 is used to move data, such as programming instructions, between the CPUs 605, I/O device interface 610, storage 630, network interface 615, and memory 625. The interconnect 620 can be implemented using one or more busses. The CPUs 605 can be a single CPU, multiple CPUs, or a single CPU having multiple processing cores in various embodiments. In some embodiments, a CPU 605 can be a digital signal processor (DSP). In some embodiments, CPU 605 includes one or more 3D integrated circuits (3DICs) (e.g., 3D wafer-level packaging (3DWLP), 3D interposer based integration, 3D stacked ICs (3D-SICs), monolithic 3D ICs, 3D heterogeneous integration, 3D system in package (3DSiP), and/or package on package (PoP) CPU configurations). Memory 625 is generally included to be representative of a random access memory (e.g., static random access memory (SRAM), dynamic random access memory (DRAM), or Flash). The storage 630 is generally included to be representative of a non-volatile memory, such as a hard disk drive, solid state device (SSD), removable memory cards, optical storage, and/or flash memory devices. Additionally, the storage 630 can include storage area-network (SAN) devices, the cloud, or other devices connected to the sort manager 600 via the I/O device interface 610 or to a network 650 via the network interface 615.

In some embodiments, the memory 625 stores instructions 660. However, in various embodiments, the instructions 660 are stored partially in memory 625 and partially in storage 630, or they are stored entirely in memory 625 or entirely in storage 630, or they are accessed over a network 650 via the network interface 615.

Instructions 660 can be processor-executable instructions for performing any portion of, or all, any of the methods described in FIGS. 3-5, and/or the functionality discussed in FIGS. 1 and 2.

In various embodiments, the I/O devices 612 include an interface capable of presenting information and receiving input. For example, I/O devices 612 can present information to a listener interacting with sort manager 600 and receive input from the listener.

The sort manager 600 is connected to the network 650 via the network interface 615. Network 650 can comprise a physical, wireless, cellular, or different network.

In some embodiments, the sort manager 600 can be a multi-user mainframe computer system, a single-user system, or a server computer or similar device that has little or no direct user interface but receives requests from other computer systems (clients). Further, in some embodiments, the sort manager 600 can be implemented as a desktop computer, portable computer, laptop or notebook computer, tablet computer, pocket computer, telephone, smart phone, network switches or routers, or any other appropriate type of electronic device.

It is noted that FIG. 6 is intended to depict the representative major components of an exemplary sort manager 600. In some embodiments, however, individual components can have greater or lesser complexity than as represented in FIG. 6, components other than or in addition to those shown in FIG. 6 can be present, and the number, type, and configuration of such components can vary.

Although this disclosure includes a detailed description on cloud computing, implementation of the teachings recited herein are not limited to a cloud computing environment. Rather, embodiments of the present disclosure are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model can include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but can be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It can be managed by the organization or a third-party and can exist on-premises or off-premises.

Community cloud: the cloud infrastructure is shared by several organizations and supports a specific community that has shared concerns (e.g., mission, security requirements, policy, and compliance considerations). It can be managed by the organizations or a third-party and can exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 7:
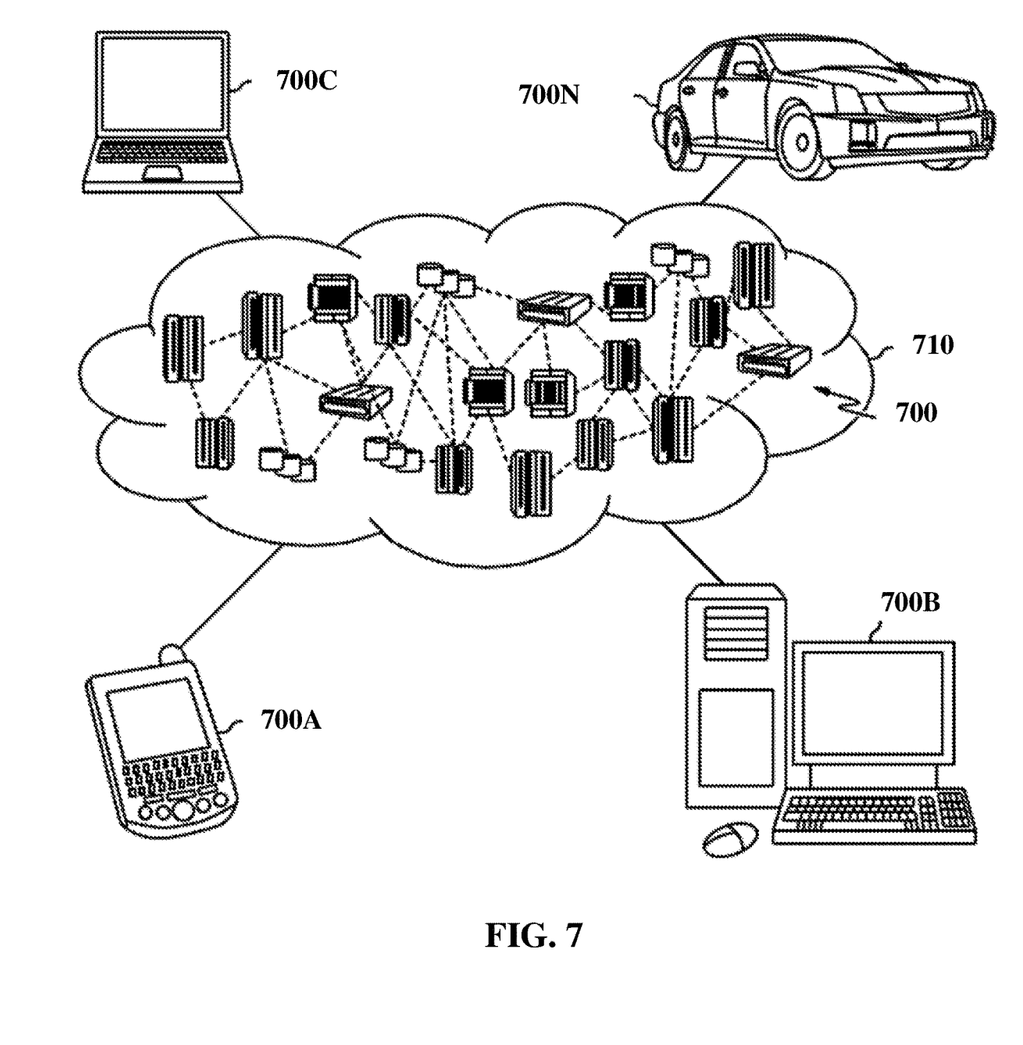
FIG. 7 depicts a cloud computing environment, according to some embodiments of the present disclosure.

FIG. 7 is a cloud computing environment 710, according to some embodiments of the present disclosure. As shown, cloud computing environment 710 includes one or more cloud computing nodes 700. The cloud computing nodes 700 can perform the methods described in FIGS. 3-5, and/or the functionality discussed in FIGS. 1 and 2. Additionally, cloud computing nodes 700 can communicate with local computing devices used by cloud consumers, such as, for example, personal digital assistant (PDA) or cellular telephone 700A, desktop computer 700B, laptop computer 700C, and/or automobile computer system 700N. Further, the cloud computing nodes 700 can communicate with one another. The cloud computing nodes 700 can also be grouped (not shown) physically or virtually, in one or more networks, such as Private, Community, Public, or Hybrid clouds as described hereinabove, or a combination thereof. This allows cloud computing environment 710 to offer infrastructure, platforms and/or software as services for which a cloud consumer does not need to maintain resources on a local computing device. It is understood that the types of computing devices 700A-N shown in FIG. 7 are intended to be illustrative only and that computing nodes 700 and cloud computing environment 710 can communicate with any type of computerized device over any type of network and/or network addressable connection (e.g., using a web browser).

Figure 8:
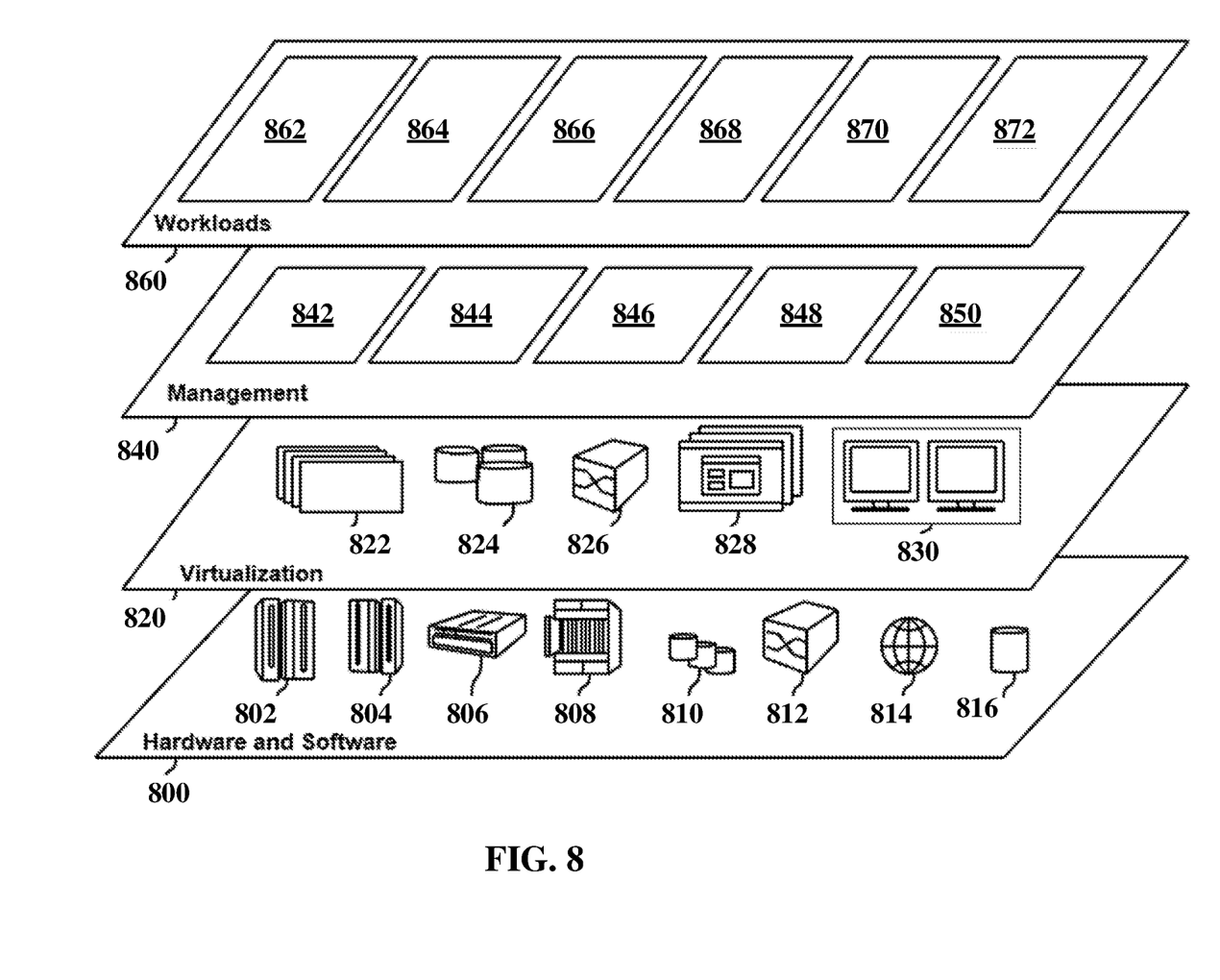
FIG. 8 depicts abstraction model layers, according to some embodiments of the present disclosure.

FIG. 8 is a set of functional abstraction model layers provided by cloud computing environment 710 (FIG. 7), according to some embodiments of the present disclosure, is shown. It should be understood in advance that the components, layers, and functions shown in FIG. 8 are intended to be illustrative only and embodiments of the disclosure are not limited thereto. As depicted below, the following layers and corresponding functions are provided.

Hardware and software layer 800 includes hardware and software components. Examples of hardware components include: mainframes 802; RISC (Reduced Instruction Set Computer) architecture based servers 804; servers 806; blade servers 808; storage devices 810; and networks and networking components 812. In some embodiments, software components include network application server software 814 and database software 816.

Virtualization layer 820 provides an abstraction layer from which the following examples of virtual entities can be provided: virtual servers 822; virtual storage 824; virtual networks 826, including virtual private networks; virtual applications and operating systems 828; and virtual clients 830.

In one example, management layer 840 can provide the functions described below. Resource provisioning 842 provides dynamic procurement of computing resources and other resources that are utilized to perform tasks within the cloud computing environment. Metering and Pricing 844 provide cost tracking as resources are utilized within the cloud computing environment, and billing or invoicing for consumption of these resources. In one example, these resources can include application software licenses. Security provides identity verification for cloud consumers and tasks, as well as protection for data and other resources. User portal 846 provides access to the cloud computing environment for consumers and system administrators. Service level management 848 provides cloud computing resource allocation and management such that required service levels are met. Service level management 848 can allocate suitable processing power and memory to process static sensor data. Service Level Agreement (SLA) planning and fulfillment 850 provide pre-arrangement for, and procurement of, cloud computing resources for which a future requirement is anticipated in accordance with an SLA.

Workloads layer 860 provides examples of functionality for which the cloud computing environment can be utilized. Examples of workloads and functions which can be provided from this layer include: mapping and navigation 862; software development and lifecycle management 864; virtual classroom education delivery 866; data analytics processing 868; transaction processing 870; and sort manager 872.

The present disclosure may be a system, a method, and/or a computer program product at any possible technical detail level of integration. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method for search results, comprising:
    identifying a plurality of archived search results generated by a keyword search, wherein the keyword search generates a plurality of search results comprising the archived search results, and wherein the archived search results are identified by their corresponding rankings fall below a predetermined ranking threshold;
    the keyword search generates a plurality of rankings corresponding to the plurality of search results, wherein the plurality of rankings is associated with a relevance of the plurality of search results, and the plurality of search results are sorted in ascending order based on the plurality of rankings to create a rankings-based order;
    searching a plurality of indices of a plurality of corresponding tape libraries comprising a plurality of tapes storing the archived search results;
    determining a plurality of estimated access times corresponding to the archived search results based on the indices;
    sorting the archived search results based on the estimated access times to create a time-based order;
    displaying, in the rankings-based order, search results of the plurality of search results wherein their corresponding rankings meet or exceed the predetermined ranking threshold before displaying the sorted archived search results in the time-based order.

2. The method of claim 1, wherein determining an estimated access time comprises identifying one or more tape drives upon which one or more of the tapes is loaded.

3. A computer program product comprising program instructions stored on a computer readable storage medium, wherein the computer readable storage medium is not a transitory signal per se, the program instructions executable by a processor to cause the processor to perform a method comprising:
    identifying a plurality of archived search results generated by a keyword search, wherein the keyword search generates a plurality of search results comprising the archived search results, and wherein the archived search results are identified by their corresponding rankings fall below a predetermined ranking threshold;
    the keyword search generates a plurality of rankings corresponding to the plurality of search results, wherein the plurality of rankings is associated with a relevance of the plurality of search results, and the plurality of search results are sorted in ascending order based on the plurality of rankings to create a rankings-based order;
    searching a plurality of indices of a plurality of corresponding tape libraries comprising a plurality of tapes storing the archived search results;

determining a plurality of estimated access times corresponding to the archived search results based on the indices;

sorting the archived search results based on the estimated access times to create a time-based order;

displaying, in the rankings-based order, search results of the plurality of search results wherein their corresponding rankings meet or exceed the predetermined ranking threshold before displaying the sorted archived search results in the time-based order.

4. The computer program product of claim 3, wherein determining an estimated access time comprises identifying one or more tape drives upon which one or more of the tapes is loaded.

5. The computer program product of claim 3, the method further comprising displaying a re-order button, wherein, in response to a selection of the re-order button, the sorted archived search results are sorted in a different order.

6. A system comprising: a computer processing circuit; and a computer-readable storage medium storing instruction, which, when executed by the computer processing circuit, are configured to cause the computer processing circuit to perform a method comprising:

identifying a plurality of archived search results generated by a keyword search, wherein the keyword search generates a plurality of search results comprising the archived search results, and wherein the archived search results are identified by their corresponding rankings fall below a predetermined ranking threshold;

the keyword search generates a plurality of rankings corresponding to the plurality of search results, wherein the plurality of rankings is associated with a relevance of the plurality of search results, and the plurality of search results are sorted in ascending order based on the plurality of rankings to create a rankings-based order;

searching a plurality of indices of a plurality of corresponding tape libraries comprising a plurality of tapes storing the archived search results;

determining a plurality of estimated access times corresponding to the archived search results based on the indices;

sorting the archived search results based on the estimated access times to create a time-based order;

displaying, in the rankings-based order, search results of the plurality of search results wherein their corresponding rankings meet or exceed the predetermined ranking threshold before displaying the sorted archived search results in the time-based order.

7. The system of claim 6, wherein determining an estimated access time comprises identifying one or more tape drives upon which one or more of the tapes is loaded.

8. The system of claim 6, the method further comprising displaying a re-order button, wherein, in response to a selection of the re-order button, the search results are sorted in a different order.

* * * * *